219-121

SEARCH ROOM

July 7, 1970 M. HATZAKIS 3,519,788

AUTOMATIC REGISTRATION OF AN ELECTRON BEAM

Filed Jan. 13, 1967 2 Sheets-Sheet 1

INVENTOR
MICHAEL HATZAKIS
BY John W Armbruster
ATTORNEY

United States Patent Office 3,519,788

Patented July 7, 1970

3,519,788

AUTOMATIC REGISTRATION OF AN ELECTRON BEAM

Michael Hatzakis, Ossining, N.Y., assignor to International Business Machines Corporation, Armonk, N.Y., a corporation of New York Filed Jan. 13, 1967, Ser. No. 609,230
Int. Cl. B23k 15/00
U.S. Cl. 219—121 11 Claims

ABSTRACT OF THE DISCLOSURE

A system is provided for automatically centering an electron working beam on the workpiece by registering the beam on an electron emissive registration or target area adjacent the workpiece. The beam, swept across the registration area in a sinusoidal pattern, produces secondary emission which is detected to produce an output error voltage when the beam is off-center. The error voltage is used to realign the beam on-center.

When fabrication of microcomponents and microcircuits involves the use of an electron beam, it is essential that the beam should be accurately registered with respect to minute component channels or circuit lines prior to each step of exposure. A registration target mark or square of emissive material is accurately positioned relative to each circuit field by the preliminary field layout procedure, and it is over this mark that the beam is swept thereafter for registration before each of a series of exposures on each microcomponent. The present mode of automatic registration involves applying a fast sine wave to the beam and sweeping it across the target mark so that when accurately registered, there is equal impingement upon the mark by equal parts of two successive waves. Should the beam be off-center, then one wave is less interrupted and causes more secondary emission than the other. The dual secondary emission signals are detected, amplified, filtered, and fed to a pair of amplifiers 180° out of phase which are gated at the rate of the cycling of the beam. The amplifier outputs are subtracted and provide a zero net DC signal if registration is correct. If the beam is too high or too low, a corresponding positive or negative difference signal is produced which is used to servo the beam into proper registration before it starts cooperating precisely with films of insulation, resist and metal to shape them as desired for masks, patterns and closely spaced circuit lines or electrodes.

In the prior art, registration of an electron beam is accomplished manually by scanning the beam over a circuitry wafer surface and monitoring the position of the mask according to the display on the scanned area; however, the hand method is laborious and time consuming. Previously, in the use of electron beam machines, considerable inconvenience was experienced in centering the beam for the initial setup at the start of each beam operating sequence. One common prior method of centering the beam consisted of positioning a suitable target such as a tungsten disc under the beam at the placement where the work was to be performed. This was done by hand and then the beam was allowed to impinge on the tungsten and a point of impingement was observed visually through an optical system sometimes comprising a microscope. The beam impingement could then be centered by observing the glowing spot while adjusting the beam machines deflection coil voltages. As already mentioned, such a manual process is very time consuming, particularly since once the beam has been centered, the target must be removed and the workpiece repositioned in the work chamber of the machine.

The present invention overcomes the above noted disadvantages by providing a novel automatic method and apparatus for centering an electron beam directly on the work in the chamber and successively between the steps of: target to circuit, target to circuit, etc., and between process steps such as cutting $SiO_2$, cutting resist, cutting metal film, and fabrication steps in general.

It is, therefore, the general object of my invention to automatically center a working electron beam, and more particularly to influence the beam with a rapidly cycling sine wave while sweeping over a registration or target area to cause secondary emission from said target to be detected in various area ratios according to whether the beam is accurately positioned, or in error, either too high or too low.

It is another object of my invention to automatically center a beam without manual intervention and to do so rapidly and accurately.

It is another object of my invention to register an electron beam by separately considering different phases of a sine wave described by said beam while traveling over a target subject to secondary emission by the impingement of the beam thereon. Since two equal half waves of motion of the beam over the target are ordinarily equalized in their emission activities of the target material, such equalization is sensed in balance and is productive of a zero DC output and no adjustment of the centralized beam is required when so centralized. However, when there is a lack of equality, due to one wave portion traveling to a greater extent beyond the target area than the other supposedly equal length wave portion, then the difference in interruptions of the emission of the two portions is detected and used to create a level of negative or positive error signal control output to readjust the beam deflection for centralization.

The foregoing and other objects of my invention are accomplished by either cutting a target or registration window area into insulation to expose a small portion of a microcircuit, or by depositing thereon a small square mark of material such as a noble metal subject to secondary emission, and then over such a target area, directing the electron beam thereon for registration prior to accomplishing its work on the microcircuit. The beam is directed over the target area in the formation of a sine wave or waves, twin portions which are to be equally distributed and equally interrupted by passing equally beyond the target area, and if not so, the secondary emission therefrom is generated and sustained in unequal portions which are compared to generate a level of error signal voltage either positive or negative to cause operation of a servo type corrective control of the beam control elements of the beam generator so that the direction of the beam is centralized before it is put to work on the remainder of the microcircuit with which the target was originally associated for accurate registration. Emissive registering metals of high atomic number and high melting point are suitable for both resistance to all fabrication steps involved during processing and a high output signal.

The foregoing and other objects, features and advantages of the invention will be apparent from the following more particular description of a preferred embodiment of the invention as illustrated in the accompanying drawings.

In the present application, although the electron beam controls are illustrated in connection with the treatment of resist coatings for either hardening or cutting such a resist, it will be realized that the controls are equally effective for other uses of the beam with the proper intensity for the purposes of microscopic accuracy of welding, or cutting, or fine line pattern treatment of materials in general. It is also evident that light, laser and other forms of beams could be usefully controlled as set forth herein.

As an example of the resist to be treated by the beam operations of the present invention, reference may be made to the patent application Ser. No. 609,145, filed on Jan. 13, 1967 by Messrs. I. Haller, M. Hatzakis and R. Srinivasan, and assigned to the assignee of the present invention. As a type of field effect semiconductor involving channels and source, drain and gate electrodes, and sets of pairs of such electrodes may be intermeshing "comb" electrodes, and circuit portions of microscopic size and spacing, reference may be made to U.S. Pat. 3,445,924 to G. Cheroff et al. for a "Method for Fabricating Insulated-Gate Field Effect Transistors Having Controlled Operating Characteristics."

Figure 1:
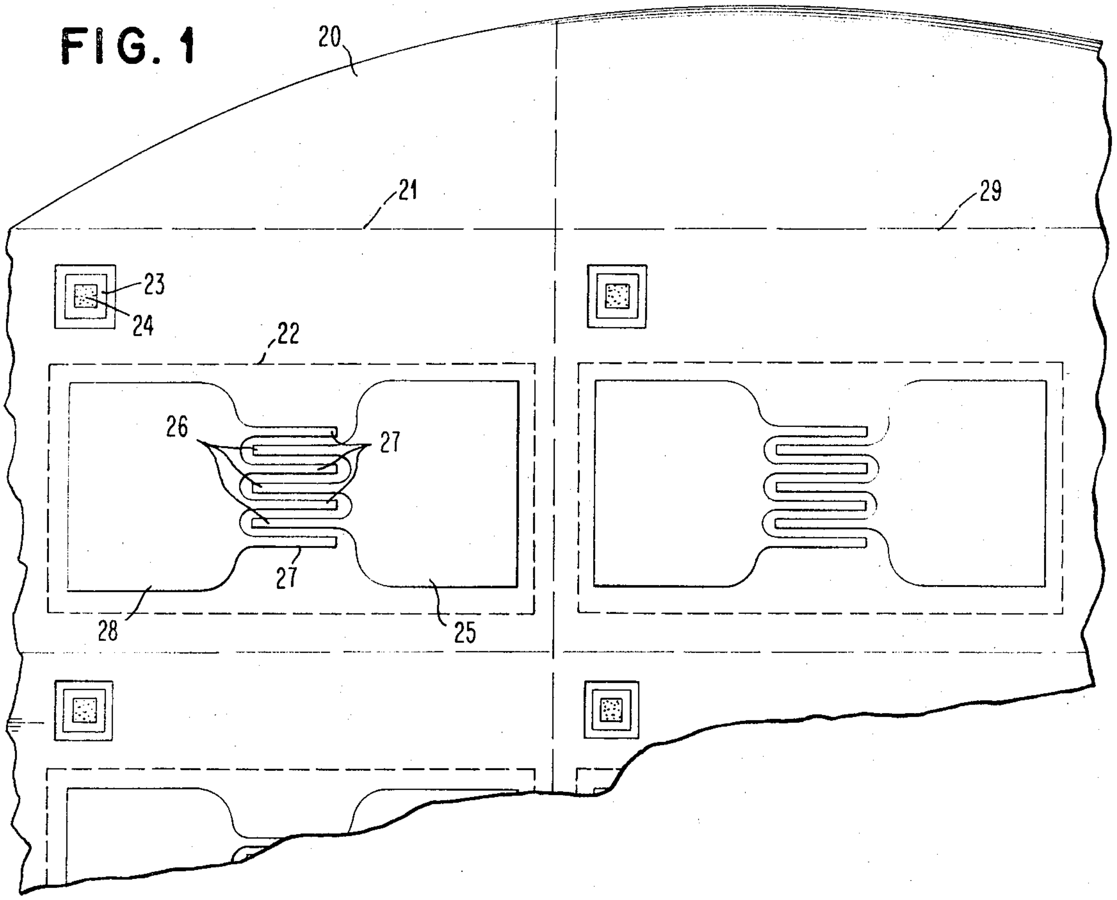
FIG. 1 is a detailed view of a portion of a wafer upon which a plurality of semiconductor devices are to be processed by the novel beam technology, each of said devices being shown with a related registration mark.

Referring to FIG. 1 as an example of a workpiece to be accurately processed microscopically by an electron beam, a workpiece is shown in the form of a small silicon doped wafer 20 bearing a large number of individual microcomponent elements 21, 29, etc., which are greatly enlarged. Each one of the elements 21, 29, etc., may be a single electronic component such as the bipolar semiconductor shown, or part of a more complicated device such as an integrated circuit with many components, circuits, and terminals.

The particular bipolar semiconductor shown is merely illustrative of use of accurate beam exposure of insulation, resist and metal, to produce microscopic lines divided by microscopic spaces, and such a teaching of beam directing technique is applicable as well to many other types of electronic circuitry and also to beam work in general.

Taking the circuit area 21, FIG. 1, at the upper left corner as representative of all the others, it will be noted that in an accurately registered placement at the upper left corner, there is a window 23 cut as an opening in the outer $SiO_2$ coating to expose an n-doped silicon area 24 of the wafer which then becomes the target or beam registering area. Such use of the basic wafer material 20 as the target material is an economical verision of the invention which could entail instead the deposition of a square 24 of a suitable emissive noble metal on the outer coat instead.

In the fabrication of microcircuits of limited over-all field size, i.e., 5–10 mils, via electron beam exposure of coatings, it is imperative to obtain accurate registration of the beam on a point outside the working field 22 prior to any of the exposures. Since the registration area material 24 is also used for the subsequent stages of fabrication, it should be suited to withstand all the processes involved in such fabrications such as etching, heating, diffusing, etc.

The present target registration mark 24, FIG. 1, consists of a square about 6 x 6 microns of exposed N doped silicon within the window 23 etched through the silicon dioxide. This mark, when scanned with the beam, provides a secondary emissive electron image or signal which is usable for registering the beam. The signal to noise ratio obtained with such a mark is low but usable even if the beam intensity is governed by a current in the range of amperes of $10^{-10}$ and above.

A stronger registration signal may be generated by a target deposition method consisting of using a raised metallic square 24 as a registration mark deposited on the top of the silicon dioxide prior to coating with a resist. The metal deposition may be achieved by evaporating a suitable metal over the entire wafer surface. Then, through the use of a standard resist and artwork technique, the required registration squares are etched. Metals with high atomic numbers and high melting point are suitable for both resistance to the processes involved during fabrication and for producing high output emissive signals.

Returning to consideration of the ronfiguration of the working area 22, FIG. 1, inside the single element area 21; although a completed semiconductor 25–28 is shown, it will be realized that the final appearance is arrived at by a series of fabricating steps, most of which are attended by registration and work of the electron beam over areas 26, 27, etc. Such steps (each of which is repeated over each area for each element on the wafer) includes a preliminary step of coating the doped silicon wafer 20 with a layer of insulation such as silicon dioxide, cutting a window 23 and a prediffusion opening in the center of each element such as 21, a following step of recoating with insulation and a resist film subject to beam exposure variation. Then there is the step of cutting the resist layer for one set of deep electrode channels 26, three of which are closely arranged in a horizontal array. This is followed by deposition of aluminum in the channels and over the resist which is removed in all areas except those cut by the deep channels. A series of four shallow comb electrode channels 27 are subsequently cut in such fashion through a second resist so as to be intermediate the three previously formed channels 26 so that altogether there are seven alternating channels for electrodes, one set going to what is later formed as the terminal 25 and another set going to the terminal 28. All of the foregoing steps require re-registration of the beam on a related target area 24 before operating for shaping the materials in the working areas such as the area 22 of the first element 21. The exact manner in which the beam is registered in cooperation with the emissive registration target 24 is about to be explained with reference to the other showings in FIG. 2 and FIG. 3 of the drawings.

Figure 2:
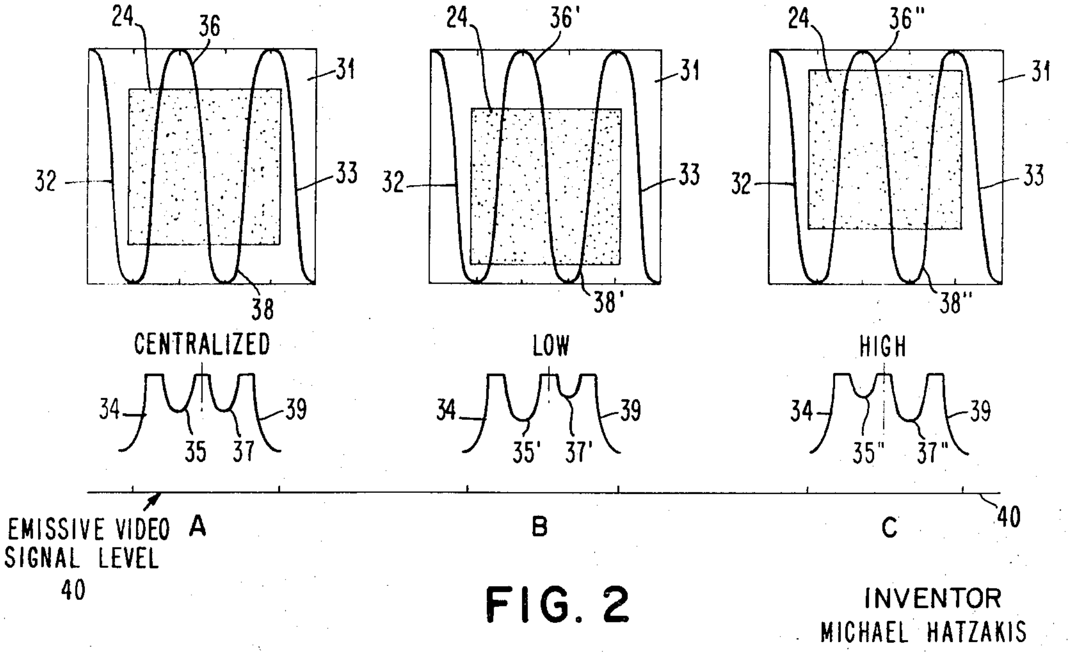
FIG. 2 shows enlarged diagrammatic views of possible variations of beam wave scanning over a target mark when centralized, or directed too high or too low, and the resulting emissive signal levels therefrom.

Before going into detail regarding the automatic beam controls, it is sufficient to note here that the automatic registration method presented is accomplished automatically in a very short interval of time. In this system, the wafer area around the register mark 24 is scanned with a working sweep of 0.5 to 1 second in one direction, and then a fast sine wave 32, 33, FIG. 2, is directed over mark 24 in the other direction. As the scan beam of a width of about 1000 angstroms impinges upon the target area 24, the portions of two sine waves 32, 33 strike the target area 24 in every registration operation. The impingement causes secondary emission as two interrupted signals which comprise the relative portions of impingements and omissions such as the overlap omissions 36 and 38 of FIG. 2A which portions 36 and 38 are equal when a centralized condition prevails as shown in A. When these "beyond target" portions 36 and 38 are not equal, then, as shown in FIGS. 2B and 2C, the enlarged portion 36′, view B, or the enlarged portion 38″, view C, indicate that the beam is either too high, or too low, respectively. The secondary emission video signal coming off the target area 24 is amplified and filtered through a 1 kc. band pass filter and then fed into a pair of amplifiers gated by 180° out of phase, 1 kc. gate signals. The two balanced outputs from the gated amplifiers are filtered and then fed to a subtracting network with the result that the net DC output is zero if both balance signals are equal in magnitude, or either positive or negative when the signals are found unequal as would be the case with the conditions of FIG. 2B or FIG. 2C.

Reference may be made to the bottom of FIG. 2 showing the levels of the emissive video signals above the zero voltage plane 40 where, in alignment with the sine wave portions 36 and 38, there are differently proportioned diminutions in emissive video signals 35, 37, 35′, 37′, 35″ and 37″ illustrating the different conditions possible with the variations in accuracy of centering of the electron beam as signified by the sweep over the target area. The presence of two, 180° out of phase, 1 kc. signals, into a composite video signal when the beam scans the registration mark, is made evident at the bottom of FIG. 2. The net DC output signal is stored in a long time constant integrator circuit and also fed to a cathode follower which provides a current proportional to the input voltage. This current is used to control the static position of the electron beam with respect to the scan surface of the wafer element.

If the beam happens to be sweeping centrally over the registration mark 24 as in FIG. 2A, then the two signal interruptions 35 and 37 are equal and no corrective current is produced. If the beam is sweeping higher or lower, FIGS. 2B, 2C, a positive or negative current is produced by the relative voltage diminutions 35′, 37′ or 35″, 37″, respectively, and a positive or negative current is produced, the beam is shifted by an amount proportional to the amount of offset, thereby bringing the beam so the mark 24 is again centralized within the scanning area 31 being swept by the beam. When registration is accomplished by setting the beam in one direction, say for example the X direction, then the scans are interchanged and the same procedure is repeated in the other direction for the Y direction.

A possible alternate method is to use simultaneous scanning in both directions with sine waves of different frequencies, thereby cutting registration time to one-half. The time required to register the beam depends upon the time constant of the integrator and the discriminator and it can be adjusted to any desired level. The registration accuracy depends on the closed loop gain of the system which can also be adjusted according to the accuracy required. One of the main advantages of this method of automatic registration of the beam is that the system is not sensitive to video signal variations across the wafer since it operates on the difference between two signals. The system operates with a time constant of approximately 0.1 second registering on a 6 x 6 micron target mark 24 with about 1% accuracy, even when there is a 50% initial misregistration of the beam scanning area.

Figure 3:
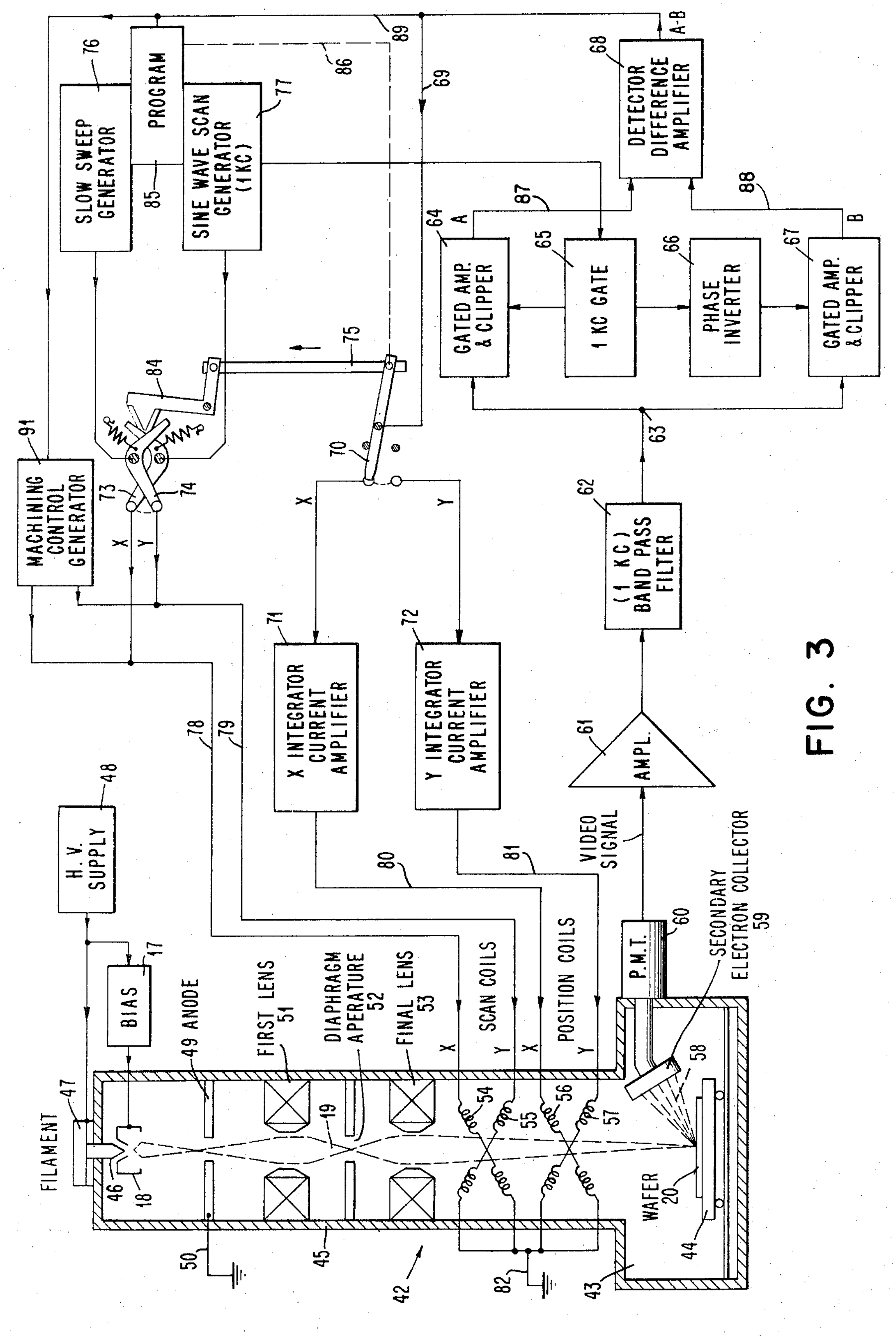
FIG. 3 is a schematic view of a beam fabricating apparatus having an automatic beam control system according to the present invention.

Referring now to FIG. 3, an electron beam device is indicated generally at 42. The device comprises a vacuum chamber 43 containing a workpiece or wafer 20 positioned on a movable table 44. The device also comprises an electron beam column 45 containing a source of electrons, beam forming means and beam focusing means. The source of electrons comprises a directly heated cathode or filament 46 which is supplied with heating current from a filament voltage supply 47. A negative accelerating voltage is supplied through the cathode 46 from a high voltage supply 48. An aperture anode 49 is positioned in the electron beam column 45 between the cathode and the workpiece 20. The anode 49 is connected to the case of the machine which is grounded at 50. The difference in potential between the cathode 46 and the anode 49 causes electrons emitted from the cathode 46 to be accelerated down the column 45. The electrons are focused into a beam indicated generally at 19 by an electron optical system comprising adjustment coils 54–57, a diaphragm 52, and magnetic lenses 51 and 53.

The beam impinges on workpiece 20, where during working cycles, it gives up kinetic energy to develop or cut the resist, or photographic materials, or to cut channels or areas in an insulator such as silicon dioxide, or to cut channels or areas into any electronic component metal film such as aluminum layers forming the electrodes or terminals of the component. The workpiece or wafer 20 may be moved underneath the beam by means of a movable table 44, but what is of greater importance here is that the beam may be deflected over the workpiece by means of deflection coils 54–57, pairs 54, 55 of which are for the slow sweep and fast sine wave sweep interchangeably for registration scanning, while the other pair of coils 56 and 57 are for positioning the beam for corrected work cycle operation.

Positioned adjacent cathode 46 is a control electrode 18. This control electrode is normally at a voltage which is more negative than the voltage applied to the cathode. The magnitude of this bias or voltage differences is controlled by bias voltage control 17. There is selection of the speed of sweeping the beam according to whether a slow cutting or a fast scanning cycle is desired, and the intensity of the beam may also be varied according to the type of operation desired.

When the beam 19 is accelerated down column 45 for work performance by heat for cutting or developing a resist, or cutting metal or insulation, the beam is governed by a program control device 85 and machine control generator 91 through the conrtol line 89 and into the common X and Y directional control lines 78 and 79 when fully registered. At such times, the sine wave scan generator 77 and the sweep generator 76, FIG. 3, are withheld from operation and only called into play when the program device 85 directs the beam over the target area 24, FIG. 1, before each working performance of the beam by generator 91 is started in the working area such as area 22.

During the working and cutting operations of the beam 19, FIG. 3, emissions from the work are not utilized for control, but it is only when the device is set and programmed at an interval for beam registration and centralization in the X or Y axis that the automatic beam registering controls come into play. A series of switches are used in the illustrative showing for manipulation to select X or Y axis registration, and although a mechanical linkage 70, 73, 74, 75 is shown for manipulation, a dotted line 86 to the program device 85 indicates that it is apparent that switching could be automatic also. As shown, the switch 70 is set to effect registration in the X direction and accordingly switch 73 is set to connect the sine wave scan generator 77 to have effect over line 78 to X scan coils 54, to line 82 and the ground. Conversely, should switch 70 be set for a Y scan and registration, the linkage 75 is lifted and cam 84 reverses the positions of switches 73 and 74 so that the sine wave scan generator 77 is connected over line 79 to Y scan coils 55, and then to 82 and the ground.

As pointed out hereinbefore with reference to FIG. 1, initially the window 23 in the insulation coating of wafer 20 is cut to expose target 24, or a raised metal emissive square 24 is placed thereon initially, along with the art work for the first component working area delineation in the working area 22. Thereafter, by programming the device prior to every X or Y working operation, the target area 24 is scanned in an effective manner to insure anew the proper registration of the beam before each of several operations. Thus, there is alternation of selection of the X or Y use of the slow sweep generator 76 and the scan generator 77 with the latter coming into play through the emissive sense controls to govern the degree of adjustment by X and Y amplifiers 71 or 72 over lines 80 or 81 to effect position control by positioning coils 56 or 57 prior to each set of working excursions governed by generator 91 and programmed scan control by the beam. The manner of effecting such automatic beam registering controls is about to be explained in detail with reference to FIGS. 2 and 3.

It is explained hereinbefore, with reference to FIG. 2, and the diagrammatic showings A, B and C thereof, that a double wave portion 32 and 33 when travelling over the target area 24, causes either balanced or unbalanced emissive voltages to be generated according to the balance of the shapes of the portions of the beam travel over the target which in turn are governed by the centralization or lack of registration of the beam over the target; as shown ideally in FIG. 2A, the wave portion 32 has a top section 36 which is equal in extent of travel beyond the target to the like portion 38 of the succeeding wave portion 33. At the lower edge of FIG. 2 it is seen that above the zero voltage line 40 there are a number of raised voltage indications of emissions sensed such as 34 followed by a dipping area 35 which corresponds to the interruption in emission by wave portion 36 passing beyond the target, and then there is also the secondary lower voltage dipping portion 37 which is due to the passage of the wave portion 38 out below the emissive target area. Since both of these 36 and 38 wave portions are equla due to the centralization of the electron beam, there is an equal extent of dipping and width by portions 35 and 37 and when the second of these is inverted by a phase inverter, there is a cancelling of the effect with a net zero DC level being maintained between 34 and 39 to indicate centralization. Such a central level indication is not true of the other two views, FIG. 2B and FIG. 2C, wherein the former represents a beam positioned toc high relative to the target area 24 with the result that the wave portion of the first wave 32 is a large overlap area 36' overshadowing the following short outside excursion wave portion 38', so that in the emissive voltage indication 35' is a much larger and wider dip or failure to sense emission than the short interval represented by 38' resulting in a voltage dip of 37'. The reversal is true as shown underneath the illustration of the low beam variation of FIG. 2C. There it is seen that the voltage portion 35'' is the small and narrow dip while the second lowering of the voltage 37'' is a dip far wider and larger. This imbalance caused by the too high or too low scanning excursion of the beam over the target area and the consequent variation in emissive electrons and net + or − level is what is used to initiate controls for correction of registration as about to be explained with reference to FIG. 3.

Now turning to FIG. 3 it is seen that above the wafer 20 there is an amount of emission 58 struck out by the beam, which emission is governed in volume according to the positioning of the sine path of the beam as explained with reference to FIG. 2. This secondary emission is picked up and sensed by the electron collector 59 shown connected to a photomultiplier tube 60. The video signal therefrom is directed into an amplifier 61 and then passes through a 1 kc. band pass filter 62 before appearing at the terminal 63 where the signal is diverted into two gated amplifiers 64 and 67 according to the timing governed by a 1 kc. gate 65 mounted between the two amplifiers and in one leg having the phase inverter 66 which acts to bring into comparative balance the voltage differences between the two sections of the dipping portions of the voltage levels shown in FIG. 2 where the voltage dips 35 and 37 are equal or unbalanced according to the degree of registration of the beam over the target area. Since the 1 kc. gate 65 is governed by a line from the sine wave scan generator 77, there is a fine degree of synchronism between the two so that the separation of two successive wave portions 32, 33 is created with precision. The amplified error signal portions A and B, are brought together by lines 87 and 88 for balancing and matching in the detector or difference amplifier 68 where there is subtraction of one from the other with the net result that a condition such as found in FIG. 2A results in a net zero DC output over the line 69 so that there is no corrective signal directed through the switch 70 and into the X integrator current amplifier 71 and hence over line 80 there will be no direction for changing the current in coil 56 and the beam is allowed to remain in centralized registration where it belongs. However, should there be a difference, then this is sensed as a net error positive or negative signal directed over line 69 and through switch 70 to be amplified by device 71 and cause coil 56 to call for a shift in the X axis registration to correct the registration of the beam. A similar kind of negative or positive signal is directed out of the amplifier 68 when necessary over the line 69 and through switch 70 as shifted to the Y current amplifier 72 and over line 80 to change the force exerted by coil 57 and the beam 19 is repositioned correctly.

While the invention has been particularly shown and described with reference to preferred embodiments thereof, it will be understood by those skilled in the art that various changes in form and details may be made therein without departing from the spirit and scope of the invention.

What is claimed is:

1. An electron beam machining apparatus comprising:
means for producing a beam of electrons,
means for directing said beam on a workpiece, said workpiece having a working area and a registering area,
means for moving said beam over said registering area in a regular wave scan pattern, said pattern including successive scans reading above and below said registering area,
means for positioning said beam relative to said workpiece areas,
means coupled to said means for moving to effect said pattern before each working operation,
means for sensing the secondary emission from said registering area while said beam moves thereover to form a signal,
means for amplifying separately the respective portions of said signal corresponding to said beam reading, above and below said registering area,
means for comparing said respective portions from said means for amplifying to form no error voltage, positive error voltage or negative error voltage, according to whether said successive scans reach above and below said registration area in equal amounts indicating a centralized beam, a greater scan reach above the area indicating a high beam, or a greater scan reach below the area indicating a low beam,
means for integrating, amplifying and converting said error voltage as a current proportional to the voltage, and
means controlled by said integrating means to control said beam positioning means to control and register the static position of the beam with respect to the working area.

2. A method of registering a sweeping beam relative to an object bearing a registration mark representing a reference position on said object comprising the steps of:
sweeping said beam over said mark in a repetitive pattern to overshoot above and below said mark,
detecting and manifesting the amount of overshoot above said mark,
detecting and manifesting the amount of overshoot below said mark, comparing the manifestation of the amount of overshoot above said mark with the manifestation of the amount of overshoot below said mark to obtain a manifestation of the difference thereof, and adjusting the relative position of the beam and said mark in accordance with the said manifestation of the difference until the overshoot wave portions are equal.

3. The method according to claim 2 wherein said object bears a film of metal and is operated upon by further steps comprising:

shifting said registered beam from said registration mark to a working area bearing said metal film, and operating said beam over said metal film to cut out a pattern therefrom.

4. The method according to claim 2 wherein said object bears a layer of resist and is operated upon with additional steps comprising:

shifting said registered beam from the registration mark to the layer of resist, and operating said beam to impinge upon said resist and develop it in a pattern to prepare it to act as a mask on said object.

5. A method of registering an electron beam with reference to a working area on a workpiece comprising the steps of:

forming a registration target mark on said workpiece in a position precisely related to said working area, directing said beam over said target mark in a regular repetitive pattern of movement to cause said beam to overshoot above and below said mark so that said beam when centralized with respect to said mark overshoots above and below same for equal parts of said pattern, sensing and manifesting the extent to which said beam overshoots above said mark, sensing and manifesting the extent to which said beam overshoots below said mark, comparing the manifestation of the extent to which said beam overshoots above said mark with the manifestation of the extent to which said beam overshoots below said mark so as to obtain an indication of the difference in the extent of overshoots, and applying corrective action according to said indication to bring the beam back to a position of movement wherein it overshoots said mark for equal parts of the pattern of movement.

6. A method of registering and utilizing a beam which sweeps in working cycles over an object and scans a registration area in registering cycles on said object, said registration area representing a reference position on said object, comprising the steps of:

scanning said beam over said registration area in a fast sine wave pattern to form sine wave peaks above and below said area, detecting and manifesting the size of said peaks above said area, detecting and manifesting the size of said peaks below said area, comparing the manifestation of the size of said peaks above said area within the manifestation of the size of said peaks below said area so as to obtain a manifestation of the difference in the size of peaks, adjusting the static sweep position of said beam with respect to said registration area in accordance with said manifestation of the difference in the size of said peaks until the size of said peaks above and below said area are equal and the beam is registered, and slowly sweeping said registered beam in working cycles over said object.

7. In an electron beam machining apparatus having beam control means and means coupled to said beam control means for automatically centering said electron beam, including;

workpiece means having work areas and at least one registration area, said at least one registration area providing a reference position with respect to said work areas for centering said electron beam;

means coupled to said beam control means to cause said beam to scan up and down said at least one registration area in a periodic pattern to cause overshoots above and below said registration area with the extent of said overshoots above said area being equal to the extent of said overshoots below said area when said beam is on-center and unequal when said beam is off-center;

means to detect said overshoots above and below said registration area to provide signal indications of the extent of said overshoot above said registration area and signal indications of the extent of said overshoot below said area;

means including compare means coupled to said means to detect to compare said signal indications of the extent of said overshoot above said registration area with said signal indications of the extent of said overshoot below said registration area to provide a signal indicative of the difference thereof to act as an error correction signal to said beam control means when said beam is off-center.

8. The apparatus as set forth in claim 7 wherein said registration area exhibits secondary emission in response to said beam and wherein said means to detect includes means to pick-up and sense said secondary emission to provide a signal pattern which is a function of said pattern overshoots above and below said registration area.

9. A method of registering and utilizing a beam which sweeps in working cycles over an object and scans a registration area in registering cycles on said object comprising the steps of:

directing said beam over said registration area in a fast sine wave with wave peaks above and below said area, comparing the amount of peaking of successive wave peaks above and below said area by sensing secondary emissions from said registration area caused by successive waves over said area, said emissions being interrupted by said wave peaks above and below said area, and obtaining an error signal according to the diminution of one or the other of the successive emissions according to the disparity of interruption by one wave peak relative to the interruption by the other wave peak, correcting the static sweep position of the beam under control of said error signal until said successive wave peaks are equal and the beam registered, and slowly sweeping said registered beam in working cycles over said object.

10. In an electron beam machining apparatus having beam control means and means coupled to said beam control means for automatically centering said electron beam, including:

workpiece means having a work area and a registration area wherein said registration area exhibits secondary emission in response to said beam;

means coupled to said beam control means to cause said beam to scan up and down said registration area in a periodic pattern to cause equal pattern overshoots above and below said registration area when said beam is on-center and unequal pattern overshoots when said beam is off-center;

means to detect and compare said pattern overshoots to provide an error correction voltage to said beam control means when said electron beam is off-center, said means to detect including means to pick-up and sense said secondary emission to provide a signal pattern which is a function of said pattern overshoots above and below said registration area and said means to compare including a pair of gated amplifier means with means to gate one of said pair of amplifiers to amplify that portion of said signal pattern corresponding to said overshoots above said registration and to gate the other of said pair of amplifiers to amplify that portion of said signal pattern corresponding to said overshoots below said registration area.

11. The apparatus as set forth in claim 10 wherein said means to compare further includes difference detector means to detect the difference between the outputs gated by said pair of gated amplifier means to thereby provide a D.C. output correction voltage when said outputs are unequal.

References Cited

UNITED STATES PATENTS

| | | | |
|---|---|---|---|
| 2,499,178 | 2/1950 | Berry et al. | 318—20.150 |
| 3,245,794 | 4/1966 | Conley | 317—235 |
| 3,308,264 | 3/1967 | Ullery. | |
| 3,326,176 | 6/1967 | Sibley. | |
| 3,389,382 | 6/1968 | Hart et al. | 219—121 |
| 3,408,474 | 10/1968 | Downing | 219—121 |
| 3,426,174 | 2/1969 | Graham et al. | 219—121 |

W. DEXTER BROOKS, Primary Examiner

U.S. Cl. X.R.

219—69